US008875181B2

(12) United States Patent
Meuninck et al.

(10) Patent No.: US 8,875,181 B2
(45) Date of Patent: Oct. 28, 2014

(54) METHOD AND SYSTEM FOR PRESENTING MEDIA CONTENT

(75) Inventors: Troy C. Meuninck, Newnan, GA (US); N. Peter Hill, Atlanta, GA (US); Oleg Kashapov, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1355 days.

(21) Appl. No.: 12/186,385

(22) Filed: Aug. 5, 2008

(65) Prior Publication Data

US 2010/0037274 A1 Feb. 11, 2010

(51) Int. Cl.
| | |
|---|---|
| *H04N 5/445* | (2011.01) |
| *H04L 29/06* | (2006.01) |
| *H04N 21/61* | (2011.01) |
| *H04N 7/173* | (2011.01) |
| *H04N 21/6405* | (2011.01) |
| *H04N 21/6408* | (2011.01) |
| *H04N 21/2665* | (2011.01) |
| *H04N 21/222* | (2011.01) |

(52) U.S. Cl.
CPC ........ *H04N 7/17318* (2013.01); *H04L 65/4076* (2013.01); *H04L 65/103* (2013.01); *H04N 21/6125* (2013.01); *H04N 7/17354* (2013.01); *H04N 21/6405* (2013.01); *H04N 21/6408* (2013.01); *H04N 21/2665* (2013.01); *H04L 65/1016* (2013.01); *H04N 21/2221* (2013.01)
USPC ............. 725/40; 725/133; 725/141; 725/153; 715/716; 715/727

(58) Field of Classification Search
CPC .............. H04L 65/1016; H04L 65/103; H04L 65/4076; H04N 21/2221; H04N 21/2665; H04N 21/6125; H04N 21/6405; H04N 21/6408; H04N 7/17318; H04N 7/17354
USPC ............. 715/700, 716, 719, 727; 725/39–61, 725/133, 141, 153
See application file for complete search history.

(56) References Cited

U.S. PATENT DOCUMENTS

| | | | |
|---|---|---|---|
| 2001/0042246 A1* | 11/2001 | Yuen et al. | 725/1 |
| 2002/0059621 A1* | 5/2002 | Thomas et al. | 725/87 |
| 2003/0041331 A1* | 2/2003 | Allen et al. | 725/106 |

(Continued)

OTHER PUBLICATIONS

61003363_Zott_et_al.pdf, U.S. Appl. No. 61/003,363, filed Nov. 16, 2007.*

(Continued)

*Primary Examiner* — Farzana Hossain
(74) *Attorney, Agent, or Firm* — Guntin & Gust, PLC; Jay H. Anderson

(57) ABSTRACT

A system that incorporates teachings of the present disclosure may include, for example, a system having a controller to detect a selection of media content from a media content source, detect that the selected media content comprises a plurality of media content types, present a plurality of media content type options, each option corresponding to one of the plurality of media content types or combinations thereof, detect a selection from the plurality of media content type options, submit a request to a targeted communication device to accept or decline the selected media content according to the selected media content type option, retrieve one or more metadata pointers from the media content source for retrieving the selected media content responsive to receiving an acceptance from the targeted communication device, and store the one or more metadata pointers and the selected media content type option. Other embodiments are disclosed.

25 Claims, 15 Drawing Sheets

(56) References Cited

U.S. PATENT DOCUMENTS

2006/0210246 A1* 9/2006 Okauchi et al. .................. 386/95
2007/0288986 A1* 12/2007 Candelore et al. ............ 725/132
2008/0091845 A1* 4/2008 Mills et al. .................... 709/246
2008/0313308 A1* 12/2008 Bodin et al. .................. 709/219
2009/0228919 A1* 9/2009 Zott et al. ........................ 725/34
2009/0271416 A1* 10/2009 White et al. .................. 707/100

OTHER PUBLICATIONS

Zipclip, "ZipClip Spread Your Fun—FAQ", 8 pages article, website last visited Jul. 23, 2008, http:www.zipclip.com/howtouse/html.

* cited by examiner

600

1100

1200

1400

METHOD AND SYSTEM FOR PRESENTING MEDIA CONTENT

FIELD OF THE DISCLOSURE

The present disclosure relates generally to media content presentation and more specifically to a method and system for presenting media content.

BACKGROUND

The public Internet provides an abundance of media content such as audio content, still image content, moving image content, and combinations thereof. Other sources such as Internet Protocol Television (TV), cable TV, and satellite TV can also provide a wealth of media content. Consumers can browse these and other sources of media content, and in some instances store the media content on devices for personal use.

DETAILED DESCRIPTION

One embodiment of the present disclosure entails a system having a controller to detect a selection of media content from a media content source, detect that the selected media content comprises a plurality of media content types, present a plurality of media content type options, each option corresponding to one of the plurality of media content types or combinations thereof, detect a selection from the plurality of media content type options, submit a request to a targeted communication device to accept or decline the selected media content according to the selected media content type option, retrieve one or more metadata pointers from the media content source for retrieving the selected media content responsive to receiving an acceptance from the targeted communication device, and store the one or more metadata pointers and the selected media content type option.

Another embodiment of the present disclosure entails a computer-readable storage medium having computer instructions for detecting in a graphical user interface a selection of media content supplied by a media content source, presenting one or more destination devices, detecting a selection of one of the one or more destination devices, and submitting to a web server one or more metadata pointers associated with the media content and the selected destination device. The web server can be adapted to submit a request to the selected destination device to accept or decline the selected media content, and store the one or more metadata pointers associated with the media content responsive to receiving an acceptance from the destination device.

Yet another embodiment of the present disclosure entails a recipient communication device having a controller to present media content associated with a request to accept or decline media content selected by an initiating communication device from a media content source, and submit an acceptance responsive to the request, thereby initiating storage of one or more metadata pointers of the media content source for retrieving the media content when requested by the recipient communication device.

Another embodiment of the present disclosure entails a method involving storing one or more metadata pointers associated with media content selected by a first communication device and destined for use by a second communication device. The one or more metadata pointers can be retrievable from a media content source presenting the media content, and can serve to locate the selected media content in the media content source for subsequent retrievals.

Figure 1:
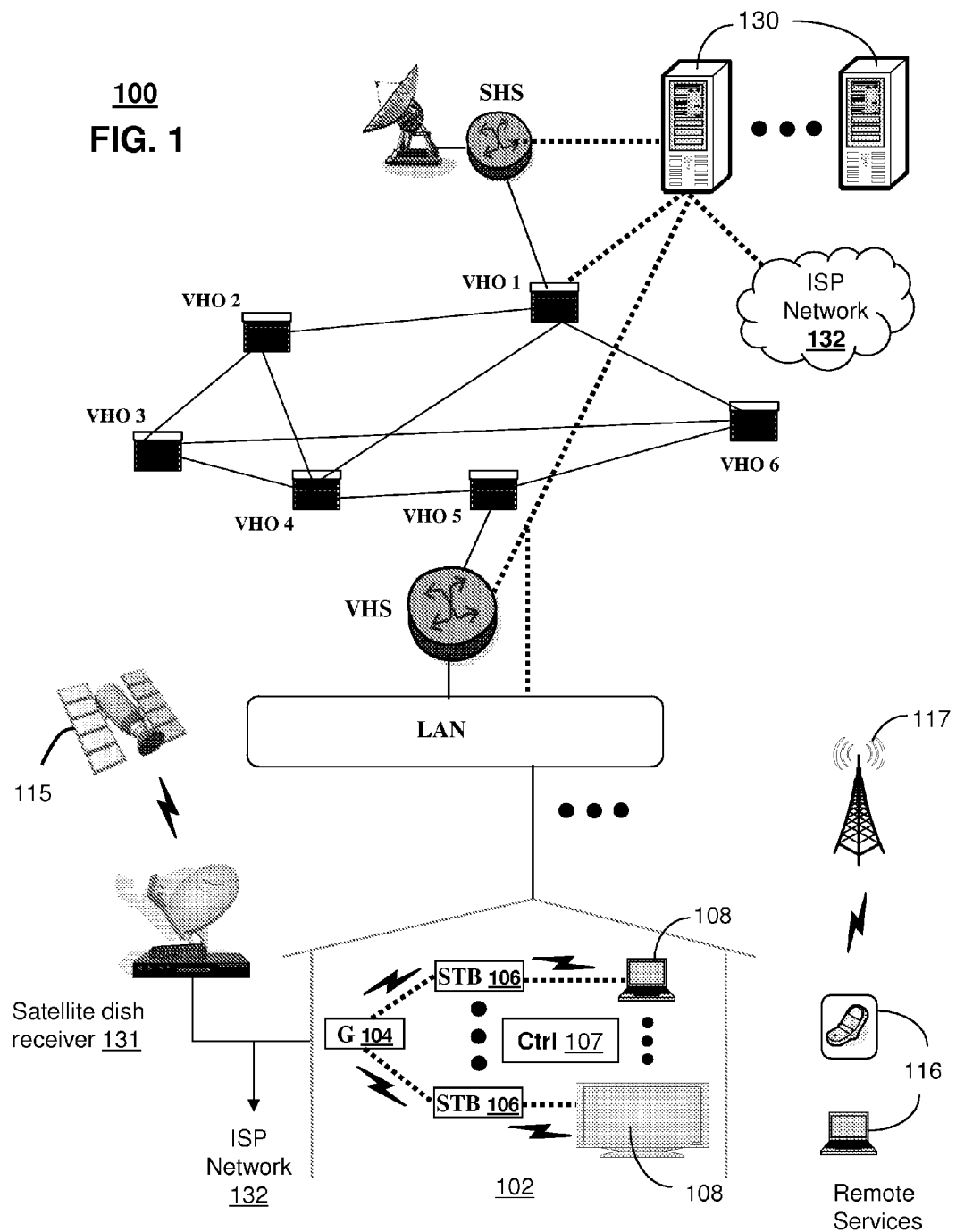
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a media portal 130 for distributing content between users of the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
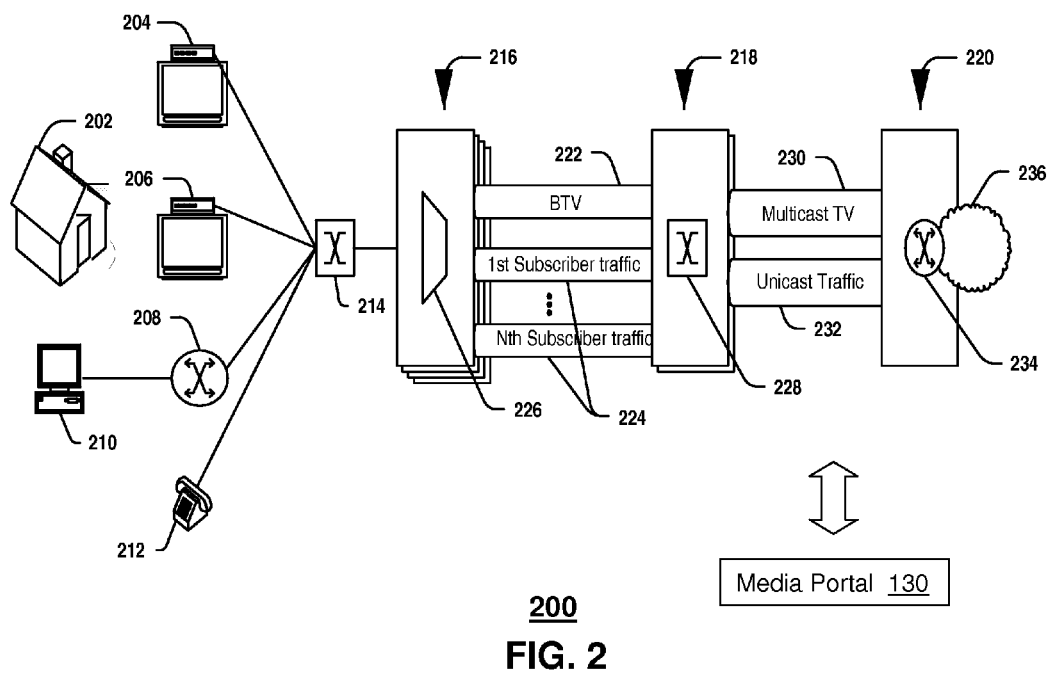

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The media portal 130 of FIG. 1 can be operably coupled to the second communication system 200 for purposes similar to those described above.

Figure 3:
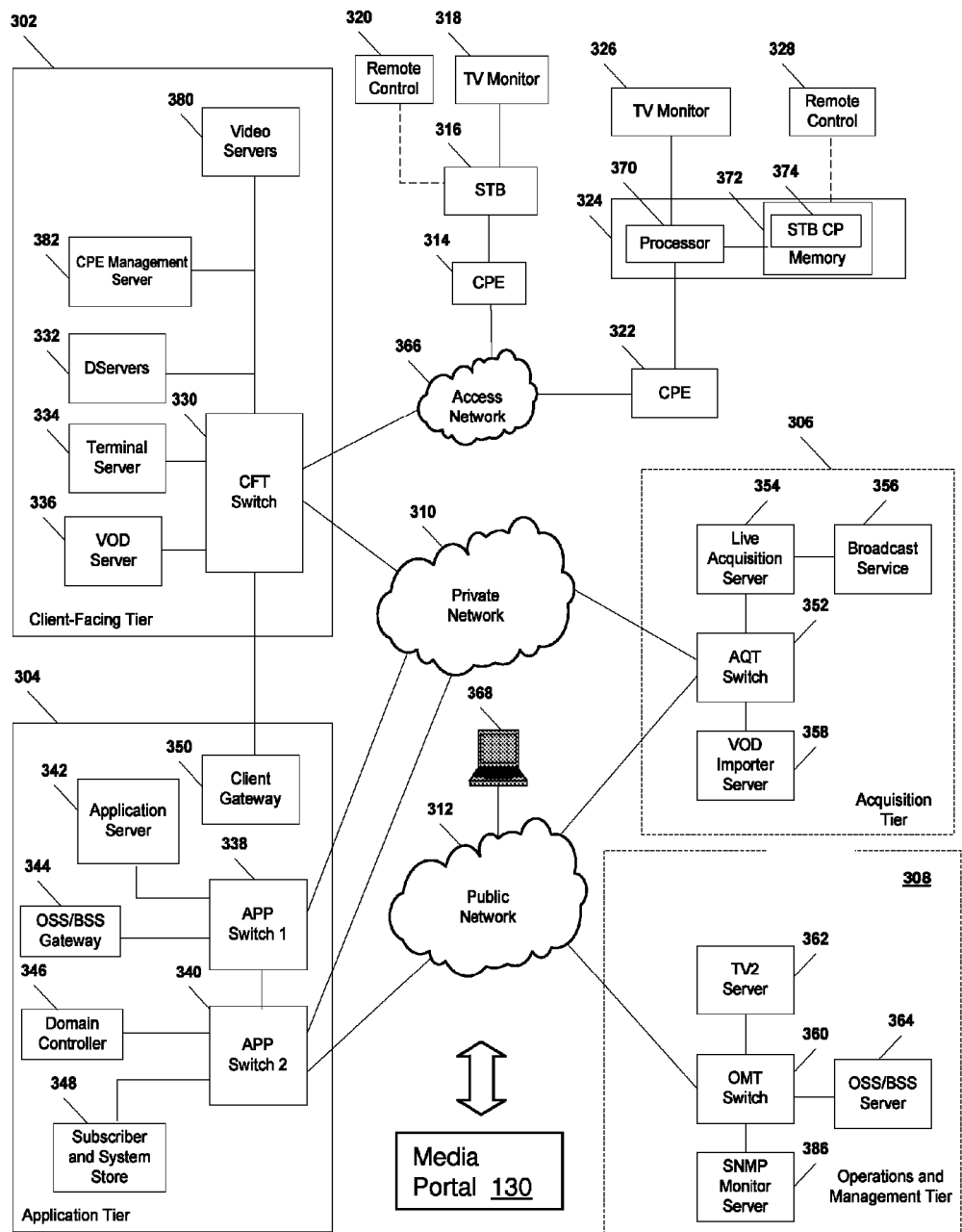

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The media portal 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
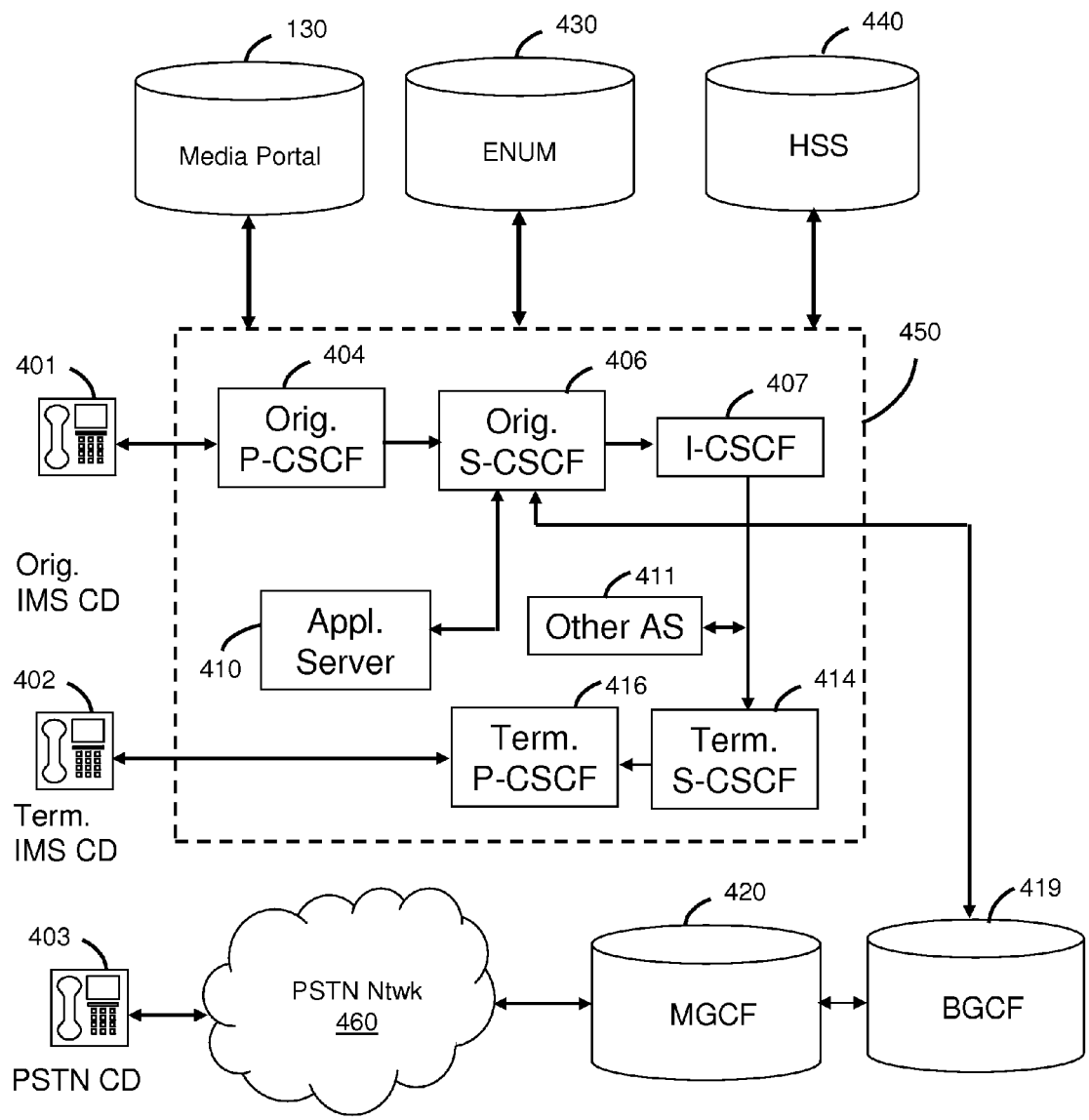

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the media portal 130 previously discussed for FIG. 1. In this representative embodiment, the media portal 130 can be accessed over a PSTN or VoIP channel of communication system 400 by common techniques such as described above.

Figure 5:
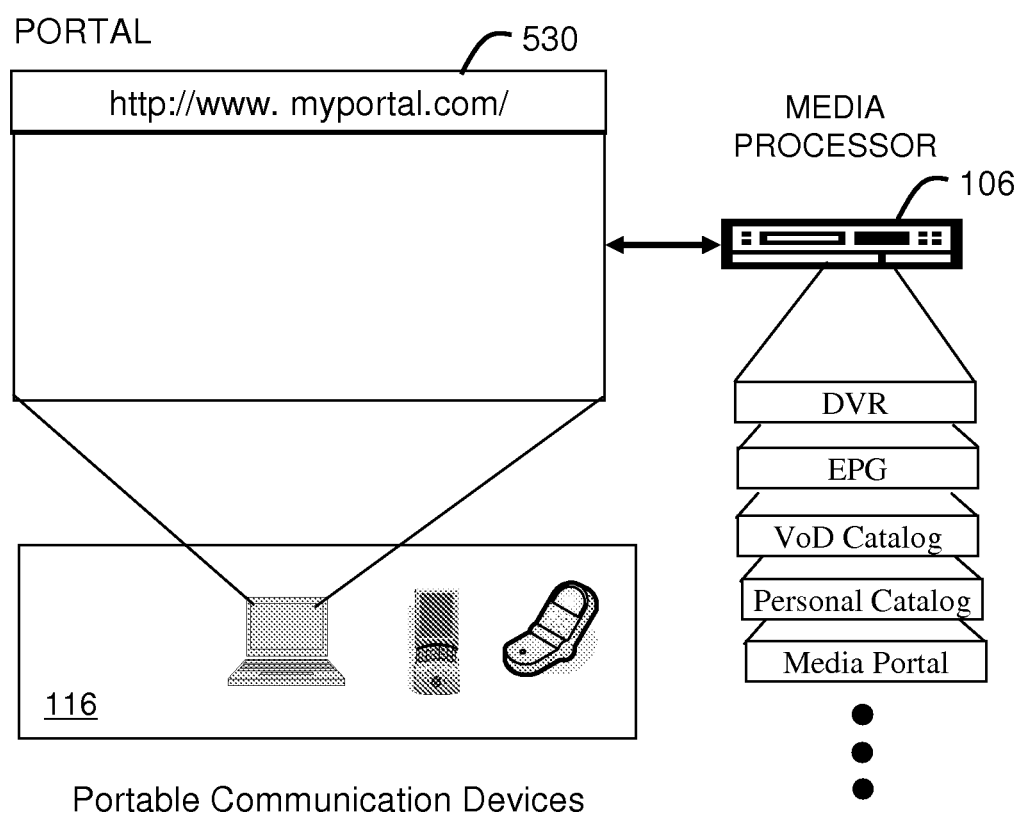
FIG. 5 depicts an illustrative embodiment of a portal interacting with at least one of the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), the media portal 130, and so on.

Figure 6:
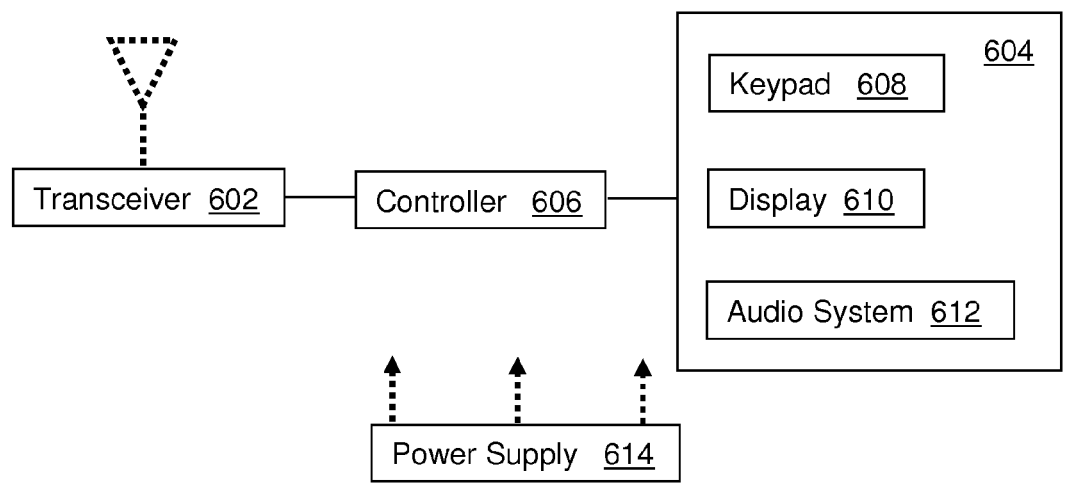
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline or wireless transceiver 602 (herein transceiver 602), a user interface (UI) 604, a power supply 614, and a controller 606 for managing operations thereof. The transceiver 602 can utilize common wireless access technologies such as cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise. In another embodiment, the transceiver 602 can support short-range wireless access technologies such as Bluetooth, WiFi, or cordless technologies such as Digital Enhanced Cordless Telecommunications (DECT) or Personal Handyphone System (PHS). In yet another embodiment the transceiver 602 can support wireline technologies such as a Public Switched Telephone Network (PSTN), VoIP or IMS communications.

The UI 604 can include a depressible or touch-sensitive keypad 608 with a roller ball or navigation disk for manipulating operations of the communication device 600. The UI 604 can further include a display 610 such as monochrome or color LCD (Liquid Crystal Display) or plasma display for conveying images to the end user of the communication device 600. In an embodiment where the display 610 is touch-sensitive, a portion of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for intercepting audible signals of an end user.

The power supply 614 can utilize common power management technologies such as replaceable batteries, supply regulation technologies, and charging system technologies for supplying energy to the components of the communication device 600 to facilitate long-range or short-range mobility applications. The controller 606 can utilize computing technologies such as a microprocessor and/or digital signal processor (DSP) with associated storage memory such a Flash, ROM, RAM, SRAM, DRAM or other storage technologies.

Figure 7:
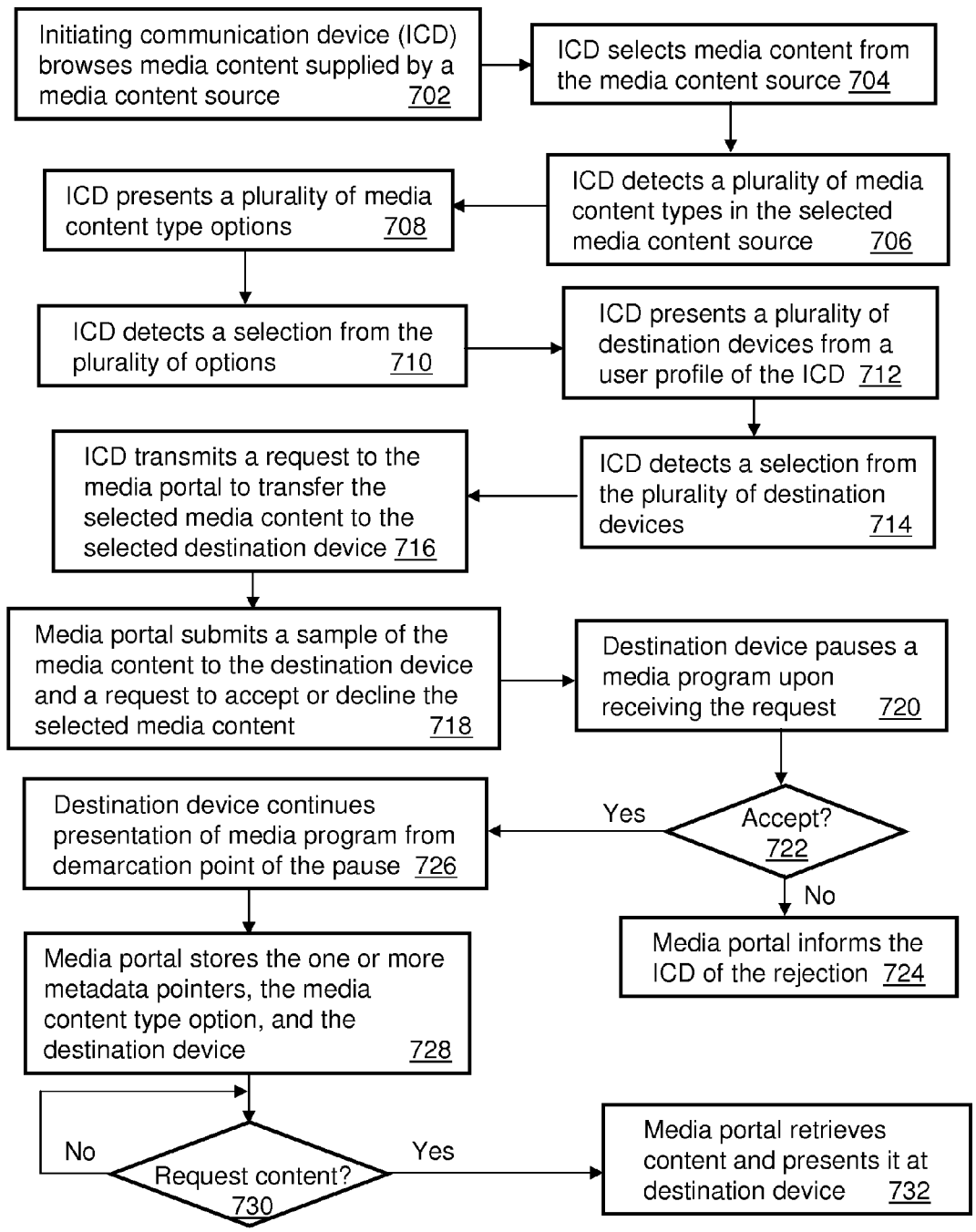
FIG. 7 depicts an illustrative method operating in portions of the communication systems of FIGS. 1-4.
Figure 8:
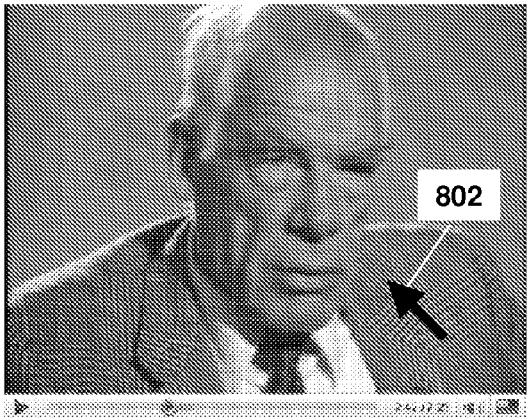
FIGS. 8-14 depict illustrative embodiments of graphical users interfaces resulting from the method of FIG. 7.
Figure 9:
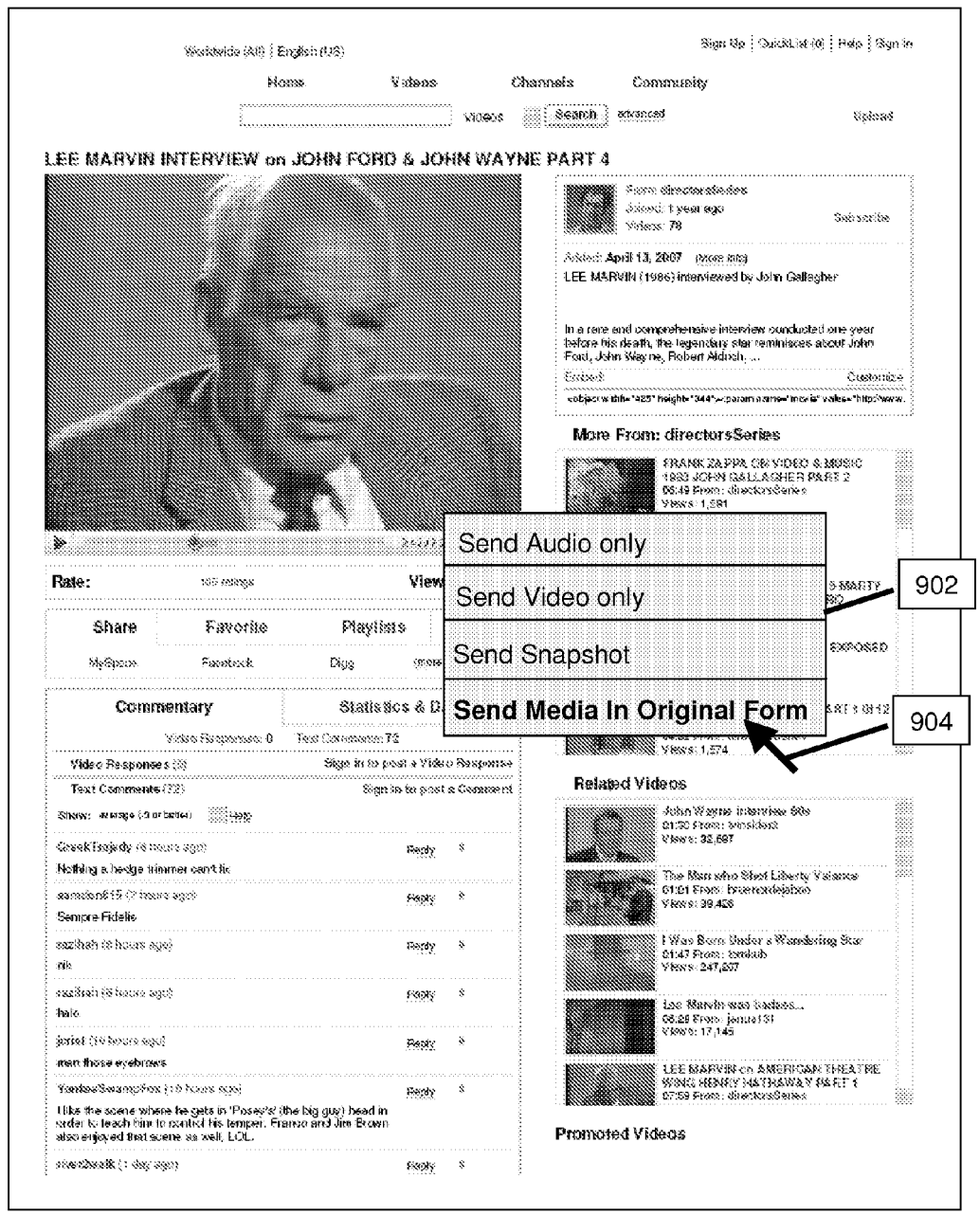

FIG. 7 depicts an illustrative method 700 operating in portions of communication systems 100-400. FIGS. 8-14 depict illustrative embodiments of graphical users interfaces (GUIs) resulting from method 700. Method 700 can begin with step 702 in which an initiating communication device (ICD) browses media content supplied by a media content source. The ICD can represent any of the communication devices discussed above (e.g., an STB, a cellular phone, an IMS phone, etc.) which is capable of receiving media content from a media content source (e.g., Internet, IPTV, satellite TV, cable TV, etc.). The media content can be audio content, still image content, moving image content or combinations thereof. The ICD can browse content using an operating system or an application operating thereon such as a browser to view content. FIG. 8 provides an illustrative embodiment of a web page representative of step 702. In step 704, the ICD selects media content from the media content source. This step can represent a user placing a mouse pointer on media content of interest (such as shown by reference 802 of FIG. 8)

and right-clicking a mouse button which presents a drop-down menu to the user to select the content (such as shown by reference 902 of FIG. 9).

Upon selecting the content, the ICD can detect in step 706 that the selected media content has more than one media content type (e.g., audio mixed with video). In response to this step, the ICD can present in step 708 a plurality of media content type options which the user can select from in the drop down menu (see reference 902). In this illustration, a user can be presented a first option for selecting only the audio portion of the selected media content, a second option for selecting only the video portion of the selected media content, a third option for selecting a snapshot of the selected media content, or a fourth option for maintaining the original integrity of the selected media content. In step 710, the ICD can detect a selection from the plurality of media content type options, which in the illustration of FIG. 9 corresponds to option four as depicted by reference 904 and the bolded menu item.

Figure 10:
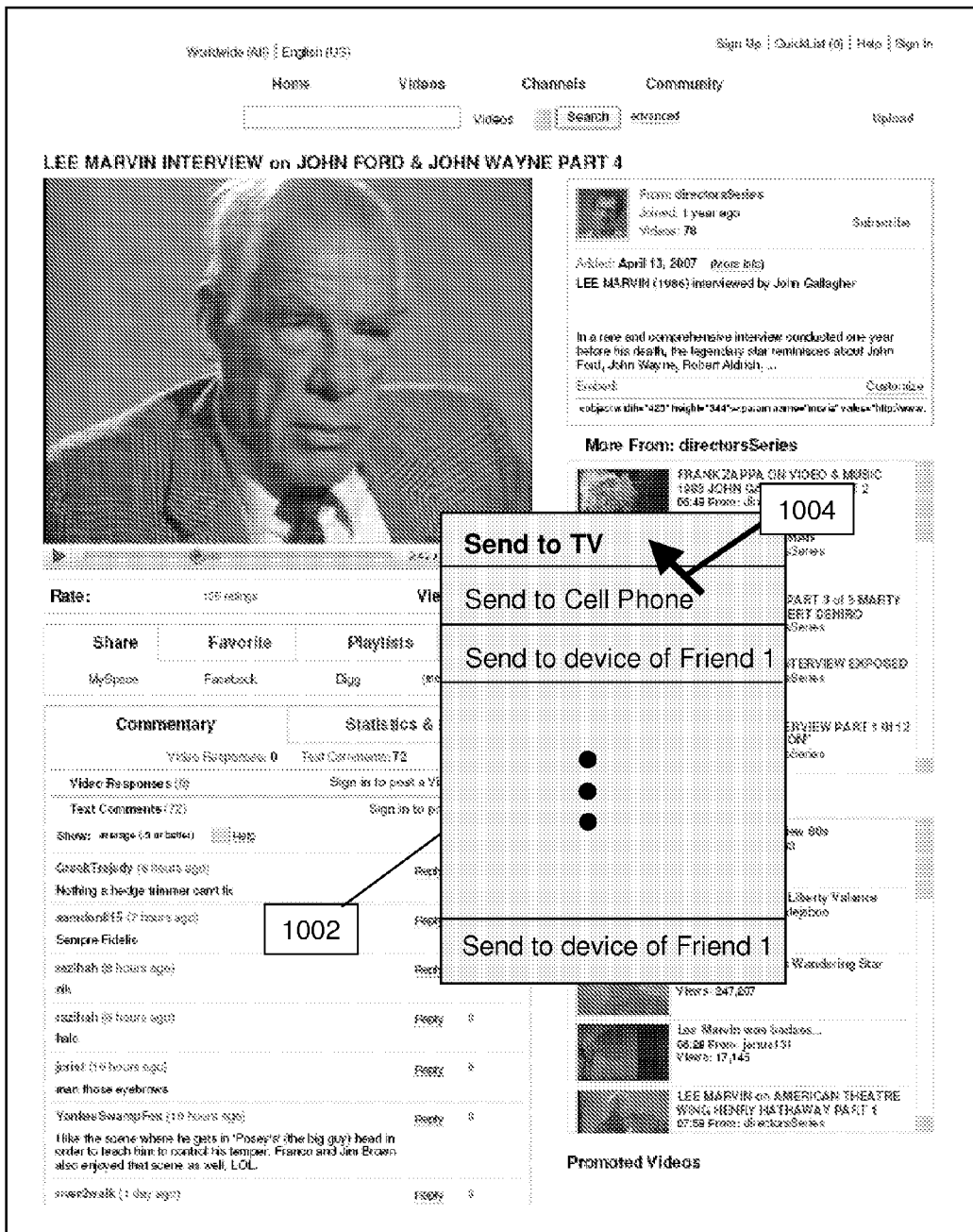

Responsive to step 710, the ICD can present in step 712 another drop-down menu 1002 as shown in FIG. 10 with a plurality of destination devices retrieved from a user profile of the ICD. In the illustration of FIG. 10, the possible destination devices include the TV of the user of the ICD, a cellular phone of the user of the ICD, a device of Friend 1, and progressing down the list, a device of Friend N. A destination device can represent any of the communication devices described earlier (e.g., STB, cellular phone, IMS phone, computer, etc.).

The user profile of the ICD can reside in the ICD and can be configured by the user of the ICD. The user profile can, for example, list a number of destination devices for transferring media content. Each entry can list a communication identifier, a name of a user of the destination device, and other related information. The communication identifier can represent an E.164 number, a SIP URI, an IP address, an identifier assigned to a computer by an operating system of said computer (e.g., PC name, login, etc.), a globally unique identifier (GUID) of an STB, or any other present or next generation communication identifier suitable for identifying and establishing communications with other communication devices.

The ICD can detect in step 714 a selection by the user of the ICD from the plurality of destination devices. In the present illustration of FIG. 10, the user has selected his/her TV as depicted by reference 1004 with the bold font. Responsive to this selection, the ICD can transmit in step 716 a request to the media portal 130 to transfer the selected media content to the selected destination device. The request can include one or more metadata pointers retrieved by the ICD from the media content source at the time that the media content was selected in step 704. The one or more metadata pointers can represent a Uniform Resource Locator (URL) and/or URI retrieved from the media content source to identify the selected media content in said source. Other suitable metadata pointers that can be utilized to locate the selected media content in the media content source can be applied to the present disclosure. The request submitted to the media portal 130 in step 716 can also include the communication identifier of the destination device selected in step 714, and the media content type option selected in step 710.

Figure 12:
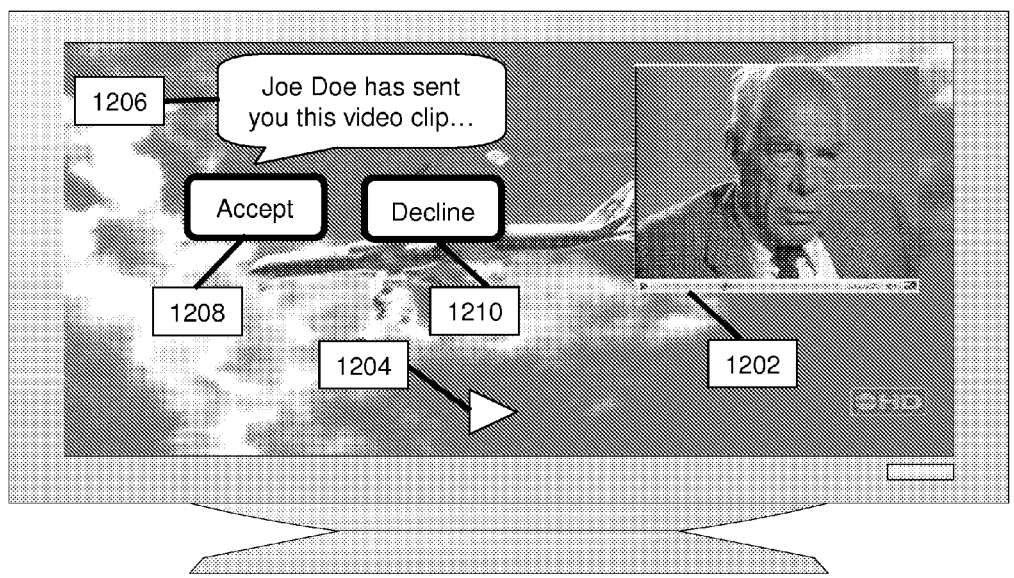

With this information, the media portal 130 can submit a sample of the media content to the destination device with a prompt requesting that it accept or decline the selected media content. An illustration of this step is shown in FIG. 12. In a situation where the media content type option selected in step 710 is different from the original media content supplied by the media content source, the media portal 130 can process the media content after a copy has been retrieved from the media content source with the one or more metadata pointers. Processing the media content can represent, for example, removing a video portion from the media content and presenting only audio to the destination device. In the present illustration, however, the user has chosen to transfer the selected the selected media content in its original form.

Figure 11:
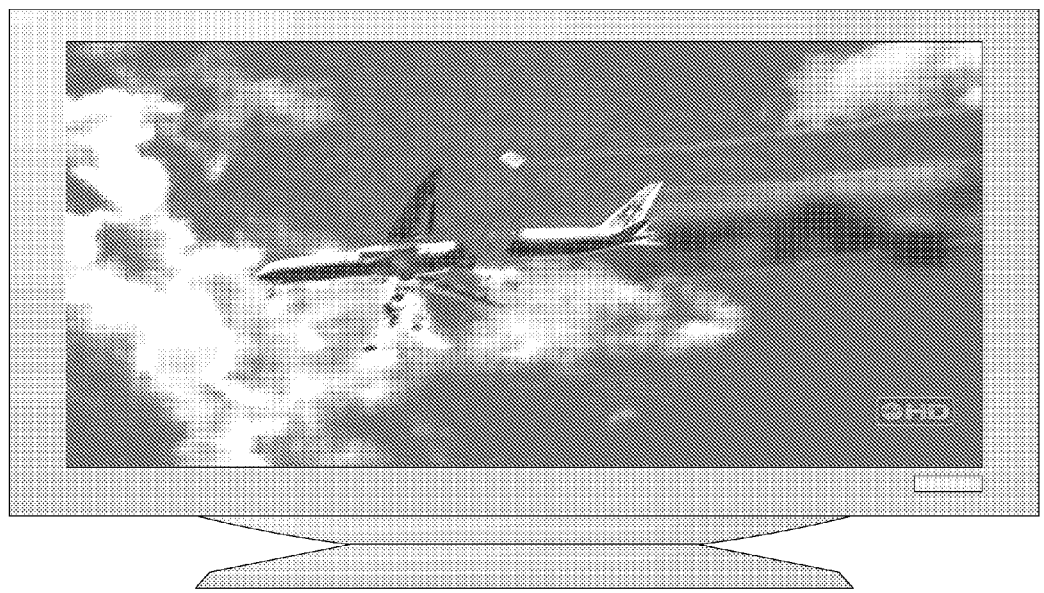

If the destination device is in the midst of presenting a media program (e.g., an STB presenting a TV program such as shown in FIG. 11), the destination device in step 720 can pause the media program upon receiving the request, record a demarcation point identifying where the media program was paused, and begin recording the media program from the demarcation point in a digital media recorder such as a DVR. FIG. 12 illustrates the sample media content superimposed on the media program by way of reference 1202, the prompt to accept or decline the content in reference 1206, the accept and decline buttons in references 1208-1210, and a resume presentation button 1204 indicating that the media program has been paused as described in step 720. If in step 722, the media portal 130 receives a rejection of the media content from the destination device, it proceeds to step 724 where it informs the ICD of the rejection through common communication means (e.g., email, SMS message, MMS message or other suitable forms of communication).

Figure 13:
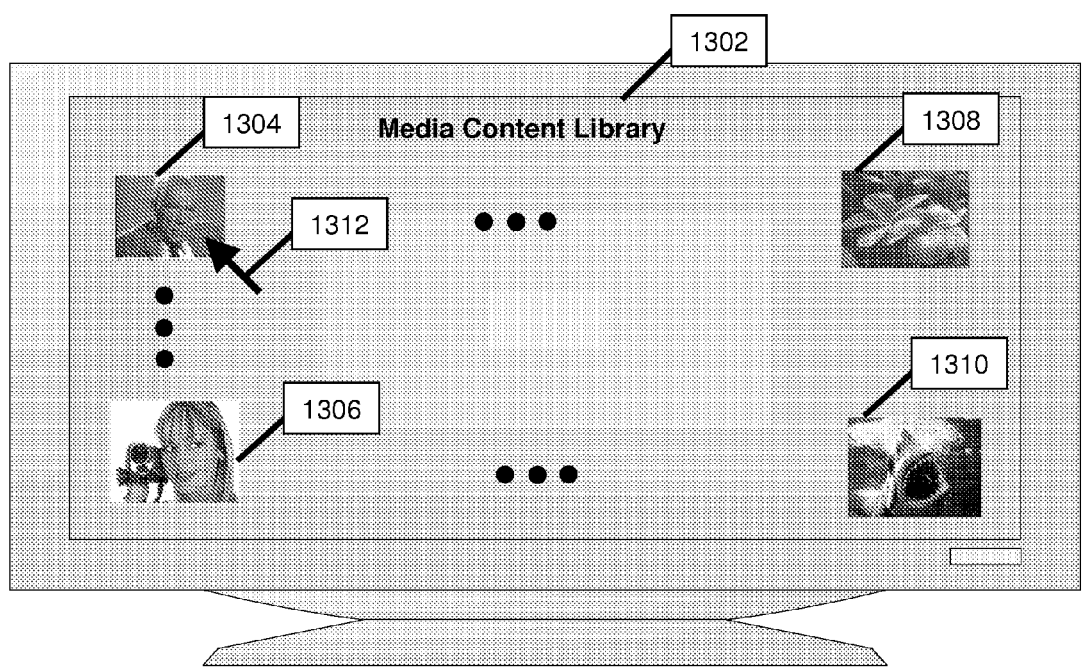

If the media content is accepted in step 722, the destination device in step 726 resumes the media program with the messages of FIG. 12 removed (such as shown in FIG. 11) from the demarcation point of the pause, and stores in a local media library a notation associated with the accepted media content which can be created by the user of the destination device. The notation can be a name defined by the user and/or a partial image capture of the media content in an icon, each which is selectable in a GUI, and which serves to inform a user of the available media content for subsequent retrieval by way of the media portal 130. A media library is shown in FIG. 13 (reference 1302) with selectable iconic symbols 1304-1310 representative of the notations described above to assist the user in future selections of media content. Each iconic symbol 1304-1310 can comprise hypertext HTML links supplied by the media portal 130 that can be used to inform the media portal 130 of a selection. The media portal 130 in step 728 can store the one or more metadata pointers, the media content type option, the communication identifier of the destination device, each supplied by the ICD in step 716. Each instance of step 728 can be associated by the media portal 130 with a corresponding hypertext HTML link of a notation in the media library of the destination device.

Figure 14:

In response to a user selecting a notation associated with media content in the media content library of the destination device (such as shown by reference 1312 of FIG. 13), the destination device can submit a request to the media portal 130 for the selected content. When such a request is detected by the media portal 130 in step 730, the media portal retrieves in step 732 the media content from the media content source according to the one or more metadata pointers, processes the media content according to the media content type option, and presents it at the destination device as shown in FIG. 14. The presentation can be a streaming presentation or a file transfer including the processed media content with playback controls. In the event a file is transferred to the destination device, the destination device can store the file in its temporary memory (e.g., RAM), and delete it when the presentation is terminated by the user. In this manner the destination device is not required to store the media content which can be useful for devices with limited storage capacity. Alternatively, the user can direct the destination device to store one or more temporary media content files supplied by the media portal 130 that may be of interest to the user.

Method 700 provides a means to transfer media content between rendering devices without storing the media content at either the initiating device, the destination device, or the media portal 130.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that the function of the media portal 130 is integrated in whole or in part in the ICD and/or the destination device. For instance, ICD can store the metadata pointers, the media content type option, and the communication identifier of destination device, and serve to transfer the media content when the destination device submits a request for said content as described earlier.

Alternatively, the destination device can store the one or more metadata pointers, and the media content type option, and retrieve the media content, process it according to the media content type option when requested. Similarly, combinations of these functions can be placed in the ICD and the destination device. For example, the ICD can store the metadata pointers and supply the media content upon a request from the destination device. The destination device can store the media content type option, and process the media content supplied by the ICD accordingly.

Method 700 can also be adapted so that user profiles can be managed by the media portal 130. In yet another illustrative embodiment, method 700 can be adapted so that initiating or destination devices operating in a multi-user environment can include a plurality of user profiles associated with a corresponding plurality of user accounts. The media portal 130 can be adapted to retrieve a user profile of a corresponding user account during a media content transfer between and ICD and the destination device.

In yet another illustrative embodiment, method 700 can be adapted so that when the ICD and a destination device belongs to the same user, the destination device can be programmed to automatically accept the requested media content transfer without presenting a prompt as shown in FIG. 12.

Other suitable modifications can be applied to the present disclosure without departing from the scope of the claims below. Accordingly, the reader is directed to the claims section for a fuller understanding of the breadth and scope of the present disclosure.

Figure 15:
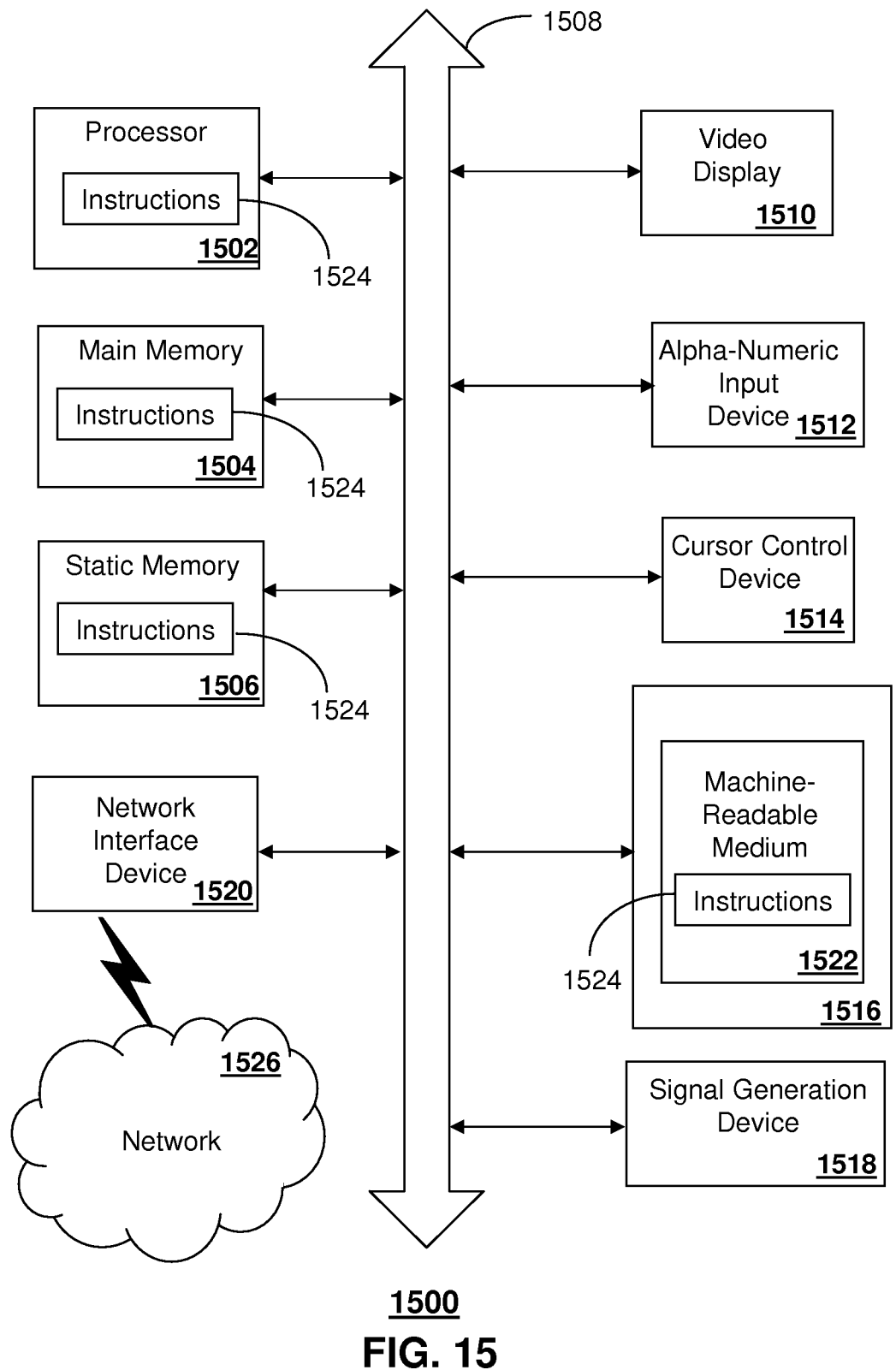
FIG. 15 is a diagrammatic representation of a machine in the form of a computer system within which a set of instructions, when executed, may cause the machine to perform any one or more of the methodologies discussed herein.

FIG. 15 depicts an exemplary diagrammatic representation of a machine in the form of a computer system 1500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, a solid state display, or a cathode ray tube (CRT)). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a machine-readable medium 1522 on which is stored one or more sets of instructions (e.g., software 1524) embodying any one or more of the methodologies or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1524, or that which receives and executes instructions 1524 from a propagated signal so that a device connected to a network environment 1526 can send or receive voice, video or data, and to communicate over the network 1526 using the instructions 1524. The instructions 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a memory having executable instructions; and
    a controller coupled with the memory, wherein the controller when executing the computer instructions performs operations comprising:
        detecting a selection of media content from a media content source;
        detecting that the selected media content comprises a plurality of media content types;
        presenting a plurality of media content type options, each option corresponding to at least one of the plurality of media content types;
        detecting a selection from the plurality of media content type options, wherein the selection comprises an image snapshot of video content;
        submitting a request to a targeted communication device to accept or decline the selected media content according to the selected media content type option, wherein the request comprises a sample of the selected media content including the image snapshot;
        retrieving a metadata pointer from the media content source, wherein the metadata pointer is configured for retrieving the selected media content responsive to receiving an acceptance from the targeted communication device and is configured to enable locating the image snapshot from among images of the video content;
        responsive to receiving the acceptance from the targeted communication device, storing the metadata pointer and the selected media content type option; and
        responsive to receiving a request from the targeted communication device for the selected media content,
            retrieving the selected media content from the media content source according to the metadata pointer,
            processing the selected media content according to the selected media content type option, and
            presenting the selected media content at the targeted communication device without the selected media content being stored at the targeted communication device.

2. The system of claim 1, wherein the media content comprises audio content and moving image content, wherein the processing of the selected media content according to the selected media content type option comprises removal of a portion of video content from the selected media content.

3. The system of claim 1, wherein the system comprises a web portal for transferring media content between the media content source and a rendering communication device, and wherein the submitting of the request to the targeted communication device causes the targeted communication device to pause a presentation of other content and record a demarcation point with respect to the other content.

4. The system of claim 1, wherein the controller is adapted to detect the selection of the media content from the media content source responsive to receiving information from a communication device associated with the selected media content and the media content source.

5. The system of claim 4, wherein the controller is adapted to identify the targeted communication device from a user profile associated with the communication device that selected the media content.

6. The system of claim 5, wherein the user profile comprises a communication identifier of the targeted communication device, and wherein the controller is adapted to communicate with the targeted communication device according to the communication identifier.

7. The system of claim 5, wherein the controller is adapted to retrieve the user profile from one of the communication device or a storage device of the system.

8. The system of claim 6, wherein the communication identifier corresponds to an E.164 telephone number, a session initiation protocol uniform resource identifier, an Internet Protocol address, an identifier assigned to a computer by an operating system of said computer, or a globally unique identifier.

9. The system of claim 1, wherein the controller is adapted to:
present a graphical user interface including media content presented by the media content source; and
detect the selection of the media content from a selection in the graphical user interface.

10. The system of claim 1, wherein the metadata pointer comprises a uniform resource locator or a uniform resource identifier.

11. The system of claim 1, wherein the system comprises a set-top box coupled to a media presentation device.

12. The system of claim 1, wherein the selection of media content is performed at an initiating communication device, and wherein the selected media content is presented at the targeted communication device without being stored at the initiating communication device or at the targeted communication device.

13. A non-transitory computer-readable storage medium, comprising executable instructions which when executed by a processor cause the processor to perform operations comprising:
detecting in a graphical user interface a selection of media content supplied by a media content source, wherein the selection comprises an image snapshot of video content;
presenting in the graphical user interface one or more destination devices;
detecting a selection of a destination devices; and
submitting to a web server a metadata pointer associated with the media content and the selected destination device, wherein the metadata pointer is configured for enabling locating the image snapshot from among images of the video content,
wherein the submitted metadata pointer is configured to enable the web server to submit a request to the selected destination device to accept or decline the selected media content, the request comprising a sample of the selected media content including the image snapshot, and is configured for storage by the web server responsive to an acceptance from the selected destination device,
wherein the web server, responsive to receiving a request from the selected destination device for the selected media content, retrieves the selected media content from the media content source according to the metadata pointer, processes the selected media content, and presents the selected media content at the selected destination device without storing the selected media content.

14. The non-transitory storage medium of claim 13, comprising executable instructions which when executed by the processor cause the processor to perform operations comprising:
retrieving the metadata pointer from the media content source prior to the presentation in the graphical user interface of the destination devices;
detecting that the selected media content comprises a plurality of media content types;
presenting a plurality of media content type options, each option corresponding to a media content type of the plurality of media content types;
detecting a selection from the plurality of media content type options; and
submitting to the web server the selected media content type option, wherein the web server stores the selected media content type option in association with the metadata pointer.

15. The non-transitory storage medium of claim 13, wherein the storage medium operates in an initiating communication device, wherein the initiating communication device is associated with a user profile, and wherein the storage medium comprises executable instructions for:
retrieving from the user profile a communication identifier associated with the selected destination device; and
submitting the communication identifier to the web server for establishing communications with the selected destination device.

16. The non-transitory storage medium of claim 15, wherein the communication identifier corresponds to an E.164 telephone number, a session initiation protocol uniform resource identifier, an Internet Protocol address, an identifier assigned to a computer by an operating system of said computer, or a globally unique identifier.

17. The non-transitory storage medium of claim 13, wherein the media content corresponds to audio content, still image content, moving image content, or combinations thereof, wherein the web server corresponds to a portal for transferring media content between the media content source and destination devices, and wherein the metadata pointer comprises a uniform resource locator or a uniform resource identifier.

18. The non-transitory storage medium of claim 15, wherein each of the initiating communication device and the one or more destination devices correspond to one of a set-top box, or an Internet-capable communication device, and wherein the set top box operates in a broadcast television network, a cable television communication network, or a satellite television communication network.

19. A recipient communication device, comprising:
a memory having executable instructions; and
a controller coupled with the memory, wherein the controller when executing the instructions performs operations comprising:
presenting media content associated with a request to accept or decline media content selected by an initiating communication device from a media content source, wherein the selected media content comprises an image snapshot of video content, and wherein the request comprises a sample of the selected media content including the image snapshot; and
submitting an acceptance, responsive to the request, to initiate storage of a metadata pointer of the media content source for retrieving the selected media content when requested by the recipient communication device, wherein the metadata pointer is configured for enabling locating and selecting the image snapshot from among images of the video content,
wherein the selected media content, responsive to being requested by the recipient communication device, is retrieved from the media content source according to the metadata pointer and processed at a portal without being stored at the portal, and wherein the selected media content is presented without being stored in the memory.

20. The recipient communication device of claim 19, wherein the controller is adapted to:
receive the request from the portal; and
submit the acceptance to the portal, wherein the metadata pointer is stored by the portal upon receiving the acceptance from the recipient communication device, wherein the metadata pointer is obtained by the initiating communication device from the media content source and provided to the portal.

21. The recipient communication device of claim 19, wherein the controller is adapted to:
receive the request from the initiating communication device; and
store the metadata pointer responsive to the acceptance.

22. The recipient communication device of claim 19, wherein the controller is adapted to:
detect that the selected media content comprises a plurality of media content types;
present a plurality of media content type options, each option corresponding to a media content type of the plurality of media content types;
detect a selection from the plurality of media content type options; and
submit the selected media content type option, thereby initiating storage of the selected media content type option in association with the metadata pointer,
wherein the selected media content type option and the metadata pointer are stored by the recipient communication device, the portal, or the initiating communication device.

23. The recipient communication device of claim 19, wherein the controller is adapted to:
receive the request while presenting a media program;
pause the media program responsive to receiving the request;
record a demarcation point responsive to the pause step; and
record the media program from the demarcation point in a digital media recorder;
receive a second request to resume the media program from the demarcation point; and
present the recorded media program starting from the demarcation point.

24. The recipient communication device of claim 19, wherein the controller is adapted to:
receive the request while presenting a media program; and
present the request in a picture-in-picture graphical user interface that mitigates an interruption of the media program.

25. A method, comprising:
storing, at a memory of a processor of a portal, a metadata pointer associated with media content selected by a first communication device and destined for use by a second communication device,
wherein the at least one metadata pointer is retrievable by the processor from a media content source presenting the media content,
wherein the stored metadata pointer serves to locate the selected media content in the media content source for subsequent retrievals by the processor,
wherein the selected media content comprises an image snapshot of video content, and
wherein the metadata pointer is configured for enabling locating the image snapshot from among images of the video content,
wherein the metadata pointer is stored responsive to acceptance of a request, submitted by the portal to the second communication device, to accept or decline the selected media content, the request comprising a sample of the selected media content including the image snapshot; and
responsive to a request from the second communication device for the selected media content,
retrieving, by the processor, the selected media content from the media content source,
processing, by the processor, the selected media content for presentation to the second communication device without storing the selected media content in the memory, and
presenting, by the processor, the selected media content at the second communication device, wherein the selected media content is not stored at the second communication device.

* * * * *